(12) United States Patent
Yang et al.

(10) Patent No.: US 8,856,575 B2
(45) Date of Patent: Oct. 7, 2014

(54) SYSTEMS AND METHODS FOR POWER MEASUREMENT IN A DATA PROCESSING SYSTEM

(75) Inventors: Shaohua Yang, Santa Clara, CA (US); Zongwang Li, San Jose, CA (US); Fan Zhang, Milpitas, CA (US); Yang Han, Sunnyvale, CA (US); Chung-Li Wang, San Jose, CA (US)

(73) Assignee: LSI Corporation, San Jose, CA (US)

( * ) Notice: Subject to any disclaimer, the term of this patent is extended or adjusted under 35 U.S.C. 154(b) by 326 days.

(21) Appl. No.: 13/284,684

(22) Filed: Oct. 28, 2011

(65) Prior Publication Data

US 2013/0111250 A1     May 2, 2013

(51) Int. Cl.
*G06F 1/00*     (2006.01)
*G06F 11/30*    (2006.01)
*G06F 1/30*     (2006.01)

(52) U.S. Cl.
CPC .............. *G06F 11/3062* (2013.01); *G06F 1/30* (2013.01)
USPC ........................................................ 713/340

(58) Field of Classification Search
CPC ..................................... G06F 1/26; G06F 1/30
USPC ................................................. 713/300–340
See application file for complete search history.

(56) References Cited

U.S. PATENT DOCUMENTS

| | | | |
|---|---|---|---|
| 5,544,138 A | 8/1996 | Bajorek et al. | |
| 5,715,467 A | 2/1998 | Jirgal | |
| 6,973,583 B2 | 12/2005 | Kobori | |
| 6,983,389 B1 | 1/2006 | Filippo | |
| 7,055,117 B2 | 5/2006 | Yee | |
| 7,203,857 B2 | 4/2007 | Hamilton | |
| 7,404,098 B2* | 7/2008 | Fette et al. ..................... | 713/324 |
| 7,555,661 B2* | 6/2009 | Luu ................ | 713/320 |
| 8,266,505 B2* | 9/2012 | Liu et al. ....................... | 714/775 |
| 2004/0255177 A1 | 12/2004 | Hamilton | |
| 2005/0163237 A1 | 7/2005 | Katanaya | |
| 2006/0107077 A1 | 5/2006 | Roth et al. | |
| 2006/0123259 A1 | 6/2006 | Yokota et al. | |
| 2008/0016381 A1* | 1/2008 | Fitton et al. ................... | 713/320 |
| 2008/0077818 A1 | 3/2008 | Rauschmayer | |

(Continued)

FOREIGN PATENT DOCUMENTS

WO      WO 2004/023268     3/2004

OTHER PUBLICATIONS

U.S. Appl. No. 12/280,790, filed Aug. 26, 2008, Rauschmayer, Richard.

(Continued)

*Primary Examiner* — Raymond Phan
(74) *Attorney, Agent, or Firm* — Hamilton DeSanctis & Cha

(57) ABSTRACT

Various embodiments of the present invention provide systems and methods for data processing. As an example, a data processing circuit is disclosed that includes: a data detector circuit, a data decoder circuit, and a power usage control circuit. The data detector circuit is operable to apply a data detection algorithm to a data input to yield a detected output. The data decoder circuit is operable to apply a data decode algorithm to a data set derived from the detected output to yield a decoded output. The power usage control circuit is operable to force a defined number of global iterations applied to the data input by the data detector circuit and the data decoder circuit regardless of convergence of the data decode algorithm.

20 Claims, 5 Drawing Sheets

(56) References Cited

U.S. PATENT DOCUMENTS

| | | | |
|---|---|---|---|
| 2009/0322150 A1* | 12/2009 | Cline et al. | 307/35 |
| 2010/0070837 A1* | 3/2010 | Xu et al. | 714/799 |
| 2010/0205462 A1* | 8/2010 | Rauschmayer et al. | 713/300 |
| 2010/0218020 A1 | 8/2010 | Rauschmayer et al. | |
| 2010/0268917 A1 | 10/2010 | Nation et al. | |
| 2011/0060932 A1* | 3/2011 | Conroy et al. | 713/340 |
| 2012/0324307 A1* | 12/2012 | Liu et al. | 714/752 |

OTHER PUBLICATIONS

U.S. Appl. No. 11/534,305, filed Sep. 22, 2006, Rauschmayer, Richard.

U.S. Appl. No. 12/425,507, filed Apr. 17, 2009, Nation et al.

U.S. Appl. No. 12/772,108, filed Apr. 30, 2010, Rauschmayer, Richard.

U.S. Appl. No. 12/425,532, filed Apr. 17, 2009, Nation et al.

U.S. Appl. No. 12/425,547, filed Apr. 17, 2009, Nation et al.

U.S. Appl. No. 13/167,760, filed Jun. 24, 2011, Xu, Changyou et al.

U.S. Appl. No. 13/167,764, filed Jun. 24, 2011, Li et al.

U.S. Appl. No. 13/227,557, filed Sep. 8, 2011, Yang, Shaohua et al.

International Business Machines, "Adaptive Power Management for Mobile Hard Drives", white paper dated Apr. 1999. See www.almaden.ibm.com/almaden/mobile_hard_drives.html.

* cited by examiner

SYSTEMS AND METHODS FOR POWER MEASUREMENT IN A DATA PROCESSING SYSTEM

BACKGROUND OF THE INVENTION

The present invention is related to systems and methods for characterizing data processing devices and systems, and more particularly to systems and methods for characterizing power usage in data processing devices and systems.

Data processing circuits often include a data detector circuit and a data decoder circuit. A data set is typically processed first through the data detector circuit with the results thereof being processed through the data decoder circuit. In some cases, the data set is passed through both the data detector circuit and the data decoder circuit many times before a data output is available. Devices including such data processing circuits often exhibit different power usage characteristics due to, for example, manufacturing variation. The different power usage characteristics can be obtained by testing each device. Such testing negatively affects production cost, and in some cases may be cost prohibitive.

Hence, for at least the aforementioned reasons, there exists a need in the art for advanced systems and methods for characterizing power usage in a data processing device.

BRIEF SUMMARY OF THE INVENTION

The present invention is related to systems and methods for characterizing data processing devices and systems, and more particularly to systems and methods for characterizing power usage in data processing devices and systems.

Various embodiments of the present invention provide data processing systems that include: a data detector circuit, a data decoder circuit, and a power usage control circuit. The data detector circuit is operable to apply a data detection algorithm to a data input to yield a detected output. The data decoder circuit is operable to apply a data decode algorithm to a data set derived from the detected output to yield a decoded output. The power usage control circuit is operable to force a defined number of global iterations applied to the data input by the data detector circuit and the data decoder circuit regardless of convergence of the data decode algorithm. In some cases, the data decode algorithm is, but is not limited to, a Reed Solomon data decode algorithm, or a low density parity check decode algorithm. In various cases, the data detection algorithm is, but is not limited to, a maximum a posteriori data detection algorithm, or a Viterbi algorithm data detector circuit. In one case, the data processing system is implemented as part of a storage device and a receiving device. In other cases, the data processing system is implemented as part of a data transmission device. In some cases, the data processing system is implemented as part of an integrated circuit.

In some instances of the aforementioned embodiments, the data decode circuit is further operable to complete processing of the data input based at least in part upon convergence of the data decode algorithm. In such instances, the power usage control circuit is further operable to override completion of processing of the data input based upon convergence of the data decode algorithm.

In various instances of the aforementioned embodiments, the power usage control circuit is further operable to force a defined number of local iterations applied to the data set derived from the detected output by the data decoder circuit per global iteration. In some such instances, the system further includes a programmable control register operable to store a value corresponding to the defined number of local iterations. In particular cases, the value corresponding to the defined number of local iterations is a fractional value. In such cases, the power usage control circuit is further operable to force a first defined number of local iterations applied to the data set derived from the detected output by the data decoder circuit regardless of convergence of the data decode algorithm during a first processing period and a second defined number of local iterations applied to the data set derived from the detected output by the data decoder circuit regardless of convergence of the data decode algorithm during a second processing period to yield an approximation of the value corresponding to the defined number of local iterations.

In other instances of the aforementioned embodiments, the systems further include a programmable control register operable to store a value corresponding to the defined number of global iterations. In some cases, the value corresponding to the defined number of global iterations is a fractional value. In such cases, the power usage control circuit is further operable to force a first defined number of global iterations applied to the data input by the data detector circuit and the data decoder circuit regardless of convergence of the data decode algorithm during a first processing period and a second defined number of global iterations applied to the data input by the data detector circuit and the data decoder circuit regardless of convergence of the data decode algorithm during a second processing period to yield an approximation of the value corresponding to the defined number of global iterations.

Other embodiments of the present invention provide methods for power usage characterization of a data processing device. The methods include: applying a data detection algorithm by a data detector circuit to a data input to yield a detected output; applying a data decode algorithm by a data decoder circuit to a data set derived from the detected output to yield a decoded output; and forcing a defined number of global iterations applied to the data input by the data detector circuit and the data decoder circuit regardless of convergence of the data decode algorithm.

In some cases, the methods further include programming a control register with a value corresponding to the defined number of global iterations. In some such cases, the value corresponding to the defined number of global iterations is a fractional value. In such cases, the methods further include forcing a first defined number of global iterations applied to the data input by the data detector circuit and the data decoder circuit regardless of convergence of the data decode algorithm during a first processing period and a second defined number of global iterations applied to the data input by the data detector circuit and the data decoder circuit regardless of convergence of the data decode algorithm during a second processing period to yield an approximation of the value corresponding to the defined number of global iterations.

In various cases, the data decode circuit is operable to complete processing of the data input based at least in part upon convergence of the data decode algorithm. In some such cases, the methods further include overriding completion of processing of the data input based upon convergence of the data decode algorithm. In one or more cases, the methods further include forcing a defined number of local iterations applied to the data set derived from the detected output by the data decoder circuit per global iteration. In some such cases, the methods further include programming a control register with a value corresponding to the defined number of local iterations. In particular instances, the value corresponding to the defined number of local iterations is a fractional value. In such instances, the methods further include forcing a first defined number of local iterations applied to the data set derived from the detected output by the data decoder circuit regardless of convergence of the data decode algorithm during a first processing period and a second defined number of local iterations applied to the data set derived from the detected output by the data decoder circuit regardless of convergence of the data decode algorithm during a second processing period to yield an approximation of the value corresponding to the defined number of local iterations.

Yet other embodiments of the present invention provide data storage devices that include: a storage medium; a head assembly disposed in relation to the storage medium and operable to provide a sensed signal corresponding to information on the storage medium; and a read channel circuit. The read channel includes: an analog to digital converter circuit, an equalizer circuit, a data detector circuit, a data decoder circuit, and a power usage control circuit. The analog to digital converter circuit is operable to sample an analog signal derived from the sensed signal to yield a series of digital samples. The equalizer circuit is operable to equalize the digital samples to yield a detector input. The data detector circuit is operable to apply a data detection algorithm to a detector input to yield a detected output. The data decoder circuit is operable to apply a data decode algorithm to a data set derived from the detected output to yield a decoded output. The power usage control circuit is operable to force a defined number of local iterations applied to the data set derived from the detected output by the data decoder circuit per global iteration applied to the detector input by the data detector circuit and the data decoder circuit regardless of convergence of the data decode algorithm.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

The present invention is related to systems and methods for characterizing data processing devices and systems, and more particularly to systems and methods for characterizing power usage in data processing devices and systems.

Various embodiments of the present invention provide data processing circuits that include both a data decode circuit and a data detection circuit. In addition, the data processing circuits include data decode convergence override capability and user programmable control of the number of local iterations and the number of global iterations. As used herein, the phrase "global iterations" is used in its broadest sense to mean the processing of a data set through both the data detection circuit and the data decoding circuit. As used herein, the phrase "local iterations" is used in its broadest sense to mean the processing of a data set through the data decoder circuit.

It has been observed that the power usage of a given data processing circuit correlates to the number of errors occurring in the processing of a given data set through the data processing circuit. Investigation has revealed that the correlation is due to the significant amount of power consumption by the data decoder and data detector circuits compared to other circuitry in the data processing circuit. As the number of global iterations and local iterations corresponds to the number of errors occurring in the processing of a given data set through the data processing circuit, a device may be characterized as exhibiting a certain power usage for a given error rate indirectly by artificially controlling the number of local iterations and/or global iterations that would be expected for a given error rate.

Some embodiments of the present invention utilize the data decode convergence override capability and the user programmable control of the number of local iterations and the number of global iterations to force a given data processing circuit or system to operate consistent with a desired error rate. As such, data processing circuits may be quickly evaluated to establish power usage characteristics. In some cases, such quick characterization reduces the amount of time required to manufacture a device, and thereby reduces the cost of producing data processing devices.

Figure 1:
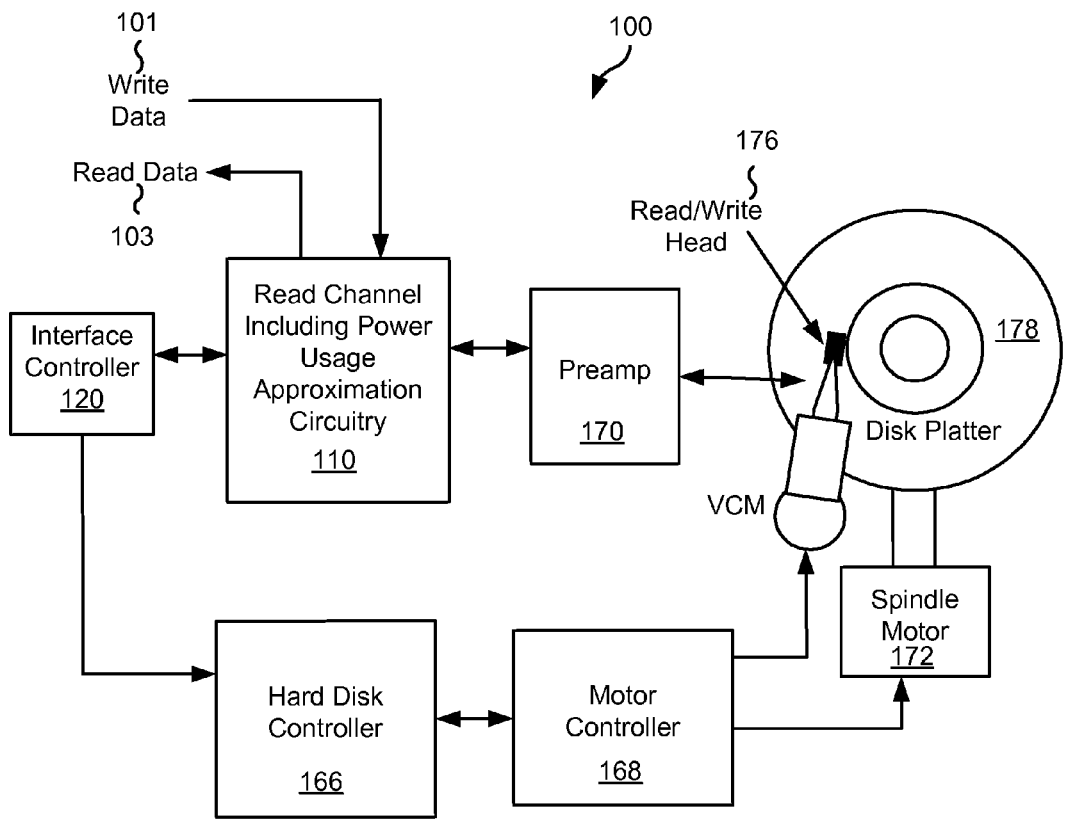
FIG. 1 shows a storage system including a read channel having power usage approximation circuitry in accordance with one or more embodiments of the present invention.

Turning to FIG. 1, a storage system 100 including a read channel circuit 110 having power usage approximation circuitry is shown in accordance with some embodiments of the present invention. Storage system 100 may be, for example, a hard disk drive. Storage system 100 also includes a preamplifier 170, an interface controller 120, a hard disk controller 166, a motor controller 168, a spindle motor 172, a disk platter 178, and a read/write head assembly 176. Interface controller 120 controls addressing and timing of data to/from disk platter 178. The data on disk platter 178 consists of groups of magnetic signals that may be detected by read/write head assembly 176 when the assembly is properly positioned over disk platter 178. In one embodiment, disk platter 178 includes magnetic signals recorded in accordance with either a longitudinal or a perpendicular recording scheme.

In a typical read operation, read/write head assembly 176 is accurately positioned by motor controller 168 over a desired data track on disk platter 178. Motor controller 168 both positions read/write head assembly 176 in relation to disk platter 178 and drives spindle motor 172 by moving read/write head assembly to the proper data track on disk platter 178 under the direction of hard disk controller 166. Spindle motor 172 spins disk platter 178 at a determined spin rate (RPMs). Once read/write head assembly 178 is positioned adjacent the proper data track, magnetic signals representing data on disk platter 178 are sensed by read/write head assembly 176 as disk platter 178 is rotated by spindle motor 172. The sensed magnetic signals are provided as a continuous, minute analog signal representative of the magnetic data on disk platter 178. This minute analog signal is transferred from read/write head assembly 176 to read channel circuit 110 via preamplifier 170. Preamplifier 170 is operable to amplify the minute analog signals accessed from disk platter 178. In turn, read channel circuit 110 decodes and digitizes the received analog signal to recreate the information originally written to disk platter 178. This data is provided as read data 103 to a receiving circuit. A write operation is substantially the opposite of the preceding read operation with write data 101 being provided to read channel circuit 110. This data is then encoded and written to disk platter 178.

Read channel circuit 110 includes a data decoder circuit and a data detector circuit. As described below in more detail, read channel circuit 110 may be programmed to artificially control the number of local iterations and/or global iterations through the combination of the data decoder circuit and the data detector circuit. In particular, natural convergence of the data decoder circuit may be precluded such that the number of local iterations and/or global iterations may be forced artificially prior to forcing an artificial convergence of the data decoder circuit. The artificial control of the number of global iterations and/or local iterations may be implemented using a circuit similar to those discussed below in relation to FIG. 3 and FIG. 5, and/or operates similar to the methods described below in relation to FIG. 4 and FIG. 6.

It should be noted that storage system 100 may be integrated into a larger storage system such as, for example, a RAID (redundant array of inexpensive disks or redundant array of independent disks) based storage system. It should also be noted that various functions or blocks of storage system 100 may be implemented in either software or firmware, while other functions or blocks are implemented in hardware.

Figure 2:
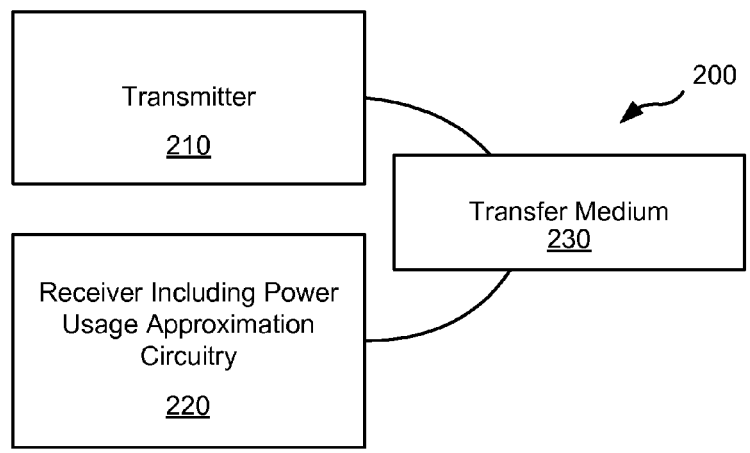
FIG. 2 shows a data transmission system including a receiver having power usage approximation circuitry in accordance with some embodiments of the present invention.

Turning to FIG. 2, a data transmission device 200 including a receiver 220 having power usage approximation circuitry is shown in accordance with some embodiments of the present invention. Data transmission system 200 includes a transmitter 210 that is operable to transmit encoded information via a transfer medium 230 as is known in the art. The encoded data is received from transfer medium 230 by receiver 220. Receiver 220 incorporates a data processing circuit that includes an a power usage approximation circuit.

Receiver 220 includes a data decoder circuit and a data detector circuit. As described below in more detail, receiver 220 may be programmed to artificially control the number of local iterations and/or global iterations through the combination of the data decoder circuit and the data detector circuit. In particular, natural convergence of the data decoder circuit may be precluded such that the number of local iterations and/or global iterations may be forced artificially prior to forcing an artificial convergence of the data decoder circuit. The artificial control of the number of global iterations and/or local iterations may be implemented using a circuit similar to those discussed below in relation to FIG. 3 and FIG. 5, and/or operates similar to the methods described below in relation to FIG. 4 and FIG. 6.

Figure 3:
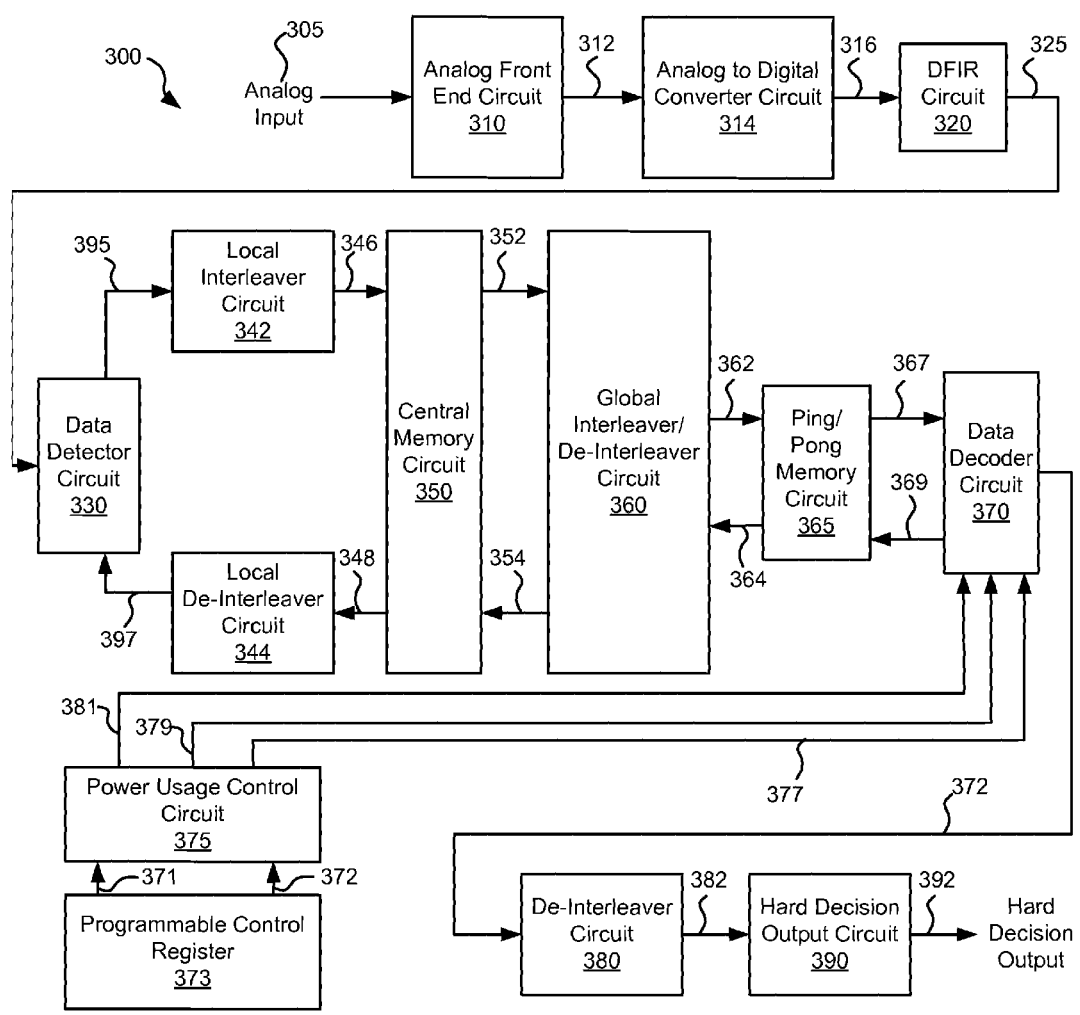
FIG. 3 depicts a data processing circuit having power usage approximation circuitry in accordance with some embodiments of the present invention.

Turning to FIG. 3, a data processing circuit 300 including power usage approximation circuitry is shown in accordance with one or more embodiments of the present invention. Data processing circuit 300 includes an analog front end circuit 310 that receives an analog signal 305. Analog front end circuit 310 processes analog signal 305 and provides a processed analog signal 312 to an analog to digital converter circuit 314. Analog front end circuit 310 may include, but is not limited to, an analog filter and an amplifier circuit as are known in the art. Based upon the disclosure provided herein, one of ordinary skill in the art will recognize a variety of circuitry that may be included as part of analog front end circuit 310. In some cases, analog signal 305 is derived from a read/write head assembly (not shown) that is disposed in relation to a storage medium (not shown). In other cases, analog signal 305 is derived from a receiver circuit (not shown) that is operable to receive a signal from a transmission medium (not shown). The transmission medium may be wired or wireless. Based upon the disclosure provided herein, one of ordinary skill in the art will recognize a variety of source from which analog input 305 may be derived.

Analog to digital converter circuit 314 converts processed analog signal 312 into a corresponding series of digital samples 316. Analog to digital converter circuit 314 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 316 are provided to an equalizer circuit 320. Equalizer circuit 320 applies an equalization algorithm to digital samples 316 to yield an equalized output 325. In some embodiments of the present invention, equalizer circuit 320 is a digital finite impulse response filter circuit as are known in the art. In some cases, equalizer 320 includes sufficient memory to maintain one or more data sets until a data detector circuit 330 is available for processing.

Equalized output 325 is provided to detector circuit 330 that is operable to apply a data detection algorithm to a received data set, and in some cases can process two or more data sets in parallel. In some embodiments of the present invention, data detector circuit is a Viterbi algorithm data detector circuit as are known in the art. In other embodiments of the present invention, data detector circuit 330 is a maximum a posteriori data detector circuit as are known in the art. Based upon the disclosure provided herein, one of ordinary skill in the art will recognize a variety of data detector circuits that may be used in relation to different embodiments of the present invention. Data detector circuit 330 is started based upon availability of a data set from either equalizer 320 or efficient interleaving/de-interleaving circuit 340.

Data detector circuit 330 applies the data detection algorithm to either a data set received as equalized output 325 or to a data set received as de-interleaved output 397 from local de-interleaver circuit 340. The result of applying the data detection algorithm is a detected output 395 that is provided to a local interleaver circuit 342. When a detected output 395 is ready, it is stored to a central memory circuit 350 where it awaits processing by a data decoder circuit 370. In some cases, detected output 395 is log likelihood ratio data. Before being stored to central memory circuit 350, detected output 395 is processed through local interleaver circuit 342 that shuffles sub-portions (i.e., local chunks) of the data set included as detected output 395 and provides an interleaved data set 346 that is stored to central memory circuit 350. Such shuffling of sub-portions reduces the impact of any burst errors in the data set.

A ping/pong memory circuit 365 is used to pull a global interleaved data set 362 from central memory circuit 350 for data decoder circuit 370 by way of a global interleaver/de-interleaver circuit 360. Once data decoder circuit 370 is available, a global interleaved data set 367 is pulled from ping/pong memory circuit 365 and data decoder circuit 370 applies a data decode algorithm to the received data set. In some embodiments of the present invention, the data decode algorithm is a low density parity check algorithm as are known in the art. Based upon the disclosure provided herein, one of ordinary skill in the art will recognize other decode algorithms that may be used in relation to different embodiments of the present invention. As the data decode algorithm completes on a given data set, the completed data set is written back as a decoded output 369 to ping/pong memory circuit 365. Once the write back is complete to ping/pong memory circuit 365, a corresponding data set 364 is transferred to central memory circuit 350 by way of global interleaver/de-interleaver circuit 360.

When a data set is transferred from central memory circuit 350 as a locally interleaved data set 352, global interleaver/de-interleaver circuit 360 rearranges global chunks of data sets such that multiple data sets may be intermixed across a single row of ping/pong memory 365. A global chunk may be the same size as the local chunks, while in other cases the global chunks may be different in size from the local chunks.

When data set 364 is written from ping/pong memory circuit 365 to central memory circuit 350, global interleaver/de-interleaver circuit 360 reverses the global interleaving (i.e., performs a de-interleaving process) originally applied when the data was originally written from central memory circuit 350 to ping/pong memory circuit 365. This reversal yields a locally interleaved data set 354 that is written to central memory circuit 350. When data detector circuit 330 becomes free, a corresponding locally interleaved data set 348 is provided to data detector circuit 330 as a de-interleaved data set 397 by a local de-interleaver circuit 344. Local de-interleaver circuit 344 reverses the processes originally applied by local interleaver circuit 342. Once data detector circuit 330 completes application of the detection algorithm to de-interleaved data set 397, the result is provided as detected output 395.

Where data decoder circuit 370 converges (i.e., results in the originally written data), the resulting decoded data is provided as a hard decision output 383 to a de-interleaver circuit 380. De-interleaver circuit 380 rearranges the data to reverse both the global and local interleaving applied to the data to yield a de-interleaved output 382. De-interleaved output 382 is provided to a hard decision output circuit 390. Hard decision output circuit 390 is operable to re-order data sets that may complete out of order back into their original order. The originally ordered data sets are then provided as a hard decision output 392.

A power usage control circuit 375 provides a convergence control signal 379, a convergence override signal 381, and a local iteration control signal 377 that are provided to data decoder circuit 370. When asserted, convergence control signal 379 causes data decoder circuit to indicate a convergence when convergence override signal 381 is asserted, and thereby processing of the current data set discontinues. When de-asserted, convergence control signal 379 disables data decoder circuit from indicating a convergence and thereby processing of the current data set continues. When asserted, convergence override signal 381 disables the ability for data decoder circuit 370 to indicate a convergence except when convergence control signal 379 is asserted. Local iteration control signal 377 is a value corresponding to a forced number of local iterations through data decoder circuits 370 (i.e., the number of successive passes through data decoder circuit 370 that are performed before a subsequent data detection is applied by data detector circuit 330). Global iteration control signal 381 is a value corresponding to a forced number of global iterations through the combination of data detector circuit 330 and data decoder circuit 370.

A programmable control register 373 may be user programmable to include a value 371 corresponding to a number of local iterations, and a value 372 corresponding to a number of global iterations. Value 371 and value 372 are provided to power usage control circuit 375 where they are used to govern assertion of convergence control signal 379, the value provided as local iteration control signal 379, and convergence override signal 381. Where value 372 exceeds a defined limit, convergence override signal 381 is always de-asserted such that processing of data decoder circuit 370 naturally converges when the original data set is recovered. Alternatively, where value 372 is less than or equal to the defined limit, convergence override signal 381 is asserted. During this time, data decoder circuit 370 only indicates a convergence when convergence control signal 379 is asserted. As such, power usage control circuit 375 asserts convergence control signal 379 once the number of global iterations indicated by value 372 have been completed. The value provided as local iteration control signal 377 corresponds to value 371.

For standard operation (i.e., non-test operation), programmable control register 373 is programmed with a value 372 that is greater than a defined limit such that data decoder circuit 370 performs a defined number of local iterations and a number of global iterations limited, at least in part, based upon a natural convergence of a currently processing data set.

For test operation, programmable control register 373 is programmed with a value 372 indicating a desired number of global iterations, and a value 371 indicating a desired number of local iterations. The combination of the desired number of local iterations and global iterations is selected based upon a number of local and global iterations that would be expected for a defined error rate. As such, measuring power usage of data processing circuit 100 operating at the defined number of local iterations and global iterations yields an approximate power usage for the defined error rate.

The following pseudo-code describes an example operation of data processing circuit 100:

```
Number of Global Iterations = 0;
If(Value 372 > Defined Number)
{
  De-assert convergence override signal 381; /* enable standard or natural convergence*/
  While (Number of Global Iterations <= MAX) /*maximum number of global iterations*/
  {
    Perform Data Detection Using Data Detector Circuit 330;
    For (i=1 to Local Iterations Limit) /*perform a number of local iterations*/
    {
      Perform Data Decode Using Data Decoder Circuit 370;
      If (Convergence) /* if natural convergence*/
      {
        Number of Global Iterations = MAX
      }
    }
    Number of Global Iterations += 1;
  }
}
Else
{
  Assert convergence override signal 381; /* disable standard or natural convergence*/
  While (Number of Global Iterations <= Value 372 && no convergence)
  /*forced number of global iterations*/
```

```
{
  De-assert convergence control signal 379;
  Perform Data Detection Using Data Detector Circuit 330;
  For (i=1 to Value 371) /*perform the defined number of local
iterations*/
  {
    Perform Data Decode Using Data Decoder Circuit 370;
  }
  Number of Global Iterations += 1;
}
Assert convergence control signal 379 /*forced completion (force
convergence)*/
}
```

Figure 4:
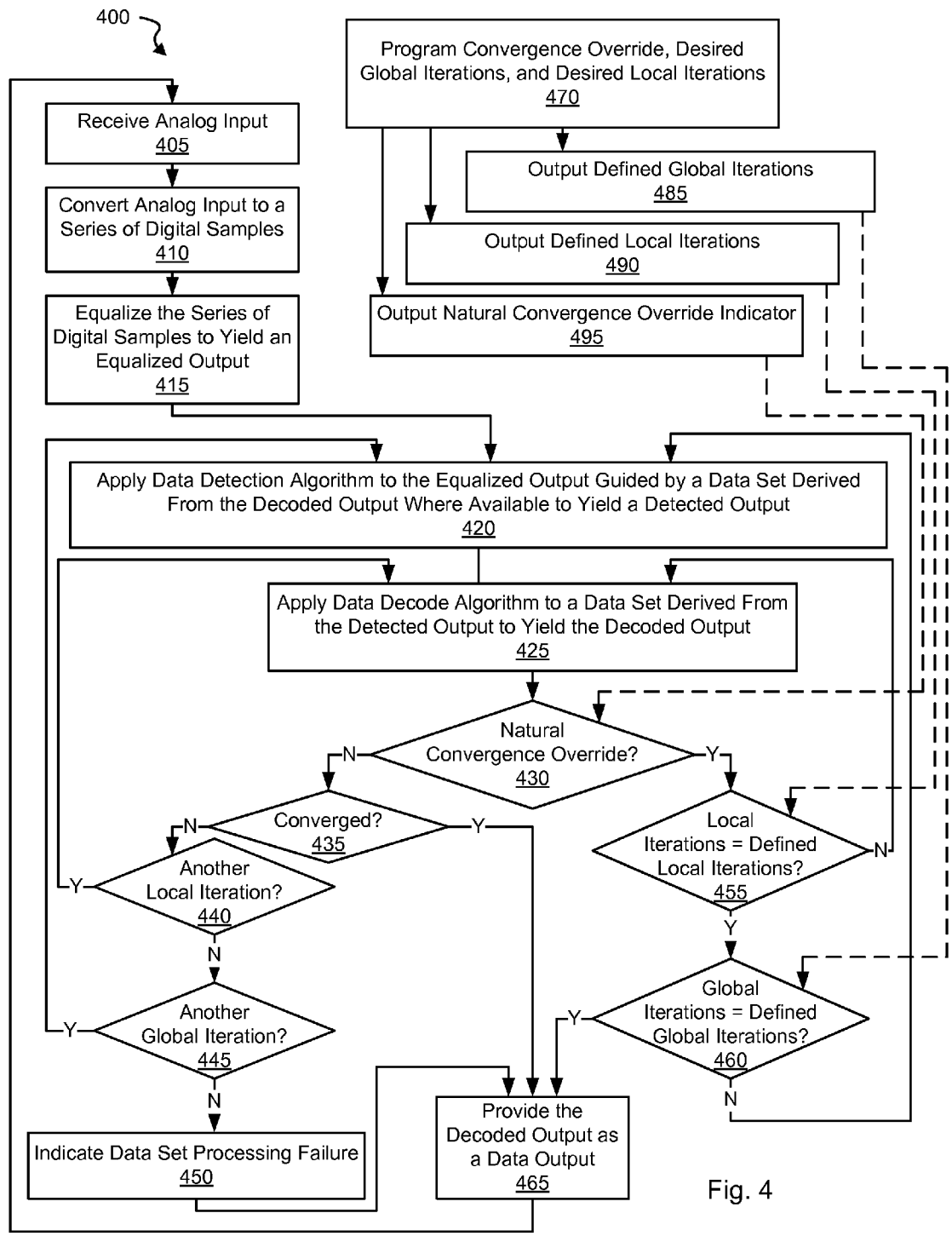
FIG. 4 is a flow diagram showing a method in accordance with one or more embodiments of the present invention for power usage control and characterization in a data processing circuit.

Turning to FIG. 4, a flow diagram 400 shows a method in accordance with one or more embodiments of the present invention for power usage control and characterization in a data processing circuit. Following flow diagram 400, a convergence override, a desired number of global iterations, and a desired number of local iterations are programmed (block 470). Where the convergence override indicator is set, a natural convergence override indicator is provided to a data processing circuit (block 495). Such a natural convergence override indicator causes the data processing to continue until a defined number of global iterations (block 485) based upon the programmed desired global iterations (block 470) and a defined number of local iterations per each global iteration (block 490) based upon the programmed desired local iterations (block 470) have completed regardless of any natural convergence (i.e., recovery of the originally written data set). Otherwise, where the natural convergence override indicator is not set, standard data processing is performed that concludes based either on a natural convergence or a time out condition.

An analog input signal is received (block 405). The analog input may be derived from, for example, a storage medium or a data transmission channel. Based upon the disclosure provided herein, one of ordinary skill in the art will recognize a variety of sources of the analog input. The analog input is converted to a series of digital samples (block 410). This conversion may be done using an analog to digital converter circuit or system as are known in the art. Of note, any circuit known in the art that is capable of converting an analog signal into a series of digital values representing the received analog signal may be used. The resulting digital samples are equalized to yield an equalized output (block 415). In some embodiments of the present invention, the equalization is done using a digital finite impulse response circuit as are known in the art. Based upon the disclosure provided herein, one of ordinary skill in the art will recognize a variety of equalizer circuits that may be used in place of such a digital finite impulse response circuit to perform equalization in accordance with different embodiments of the present invention.

A data detection algorithm is applied to the equalized output guided by a data set derived from a decoded output where a such a decoded output is available. This process yields a detected output (block 420). In some embodiments of the present invention, data detection algorithm is a Viterbi algorithm as are known in the art. In other embodiments of the present invention, the data detection algorithm is a maximum a posteriori data detector circuit as are known in the art. A data decode algorithm is applied to a data set derived from the detected output to yield a decoded output (block 425). In some cases, the data decode algorithm is a low density parity check algorithm as are known in the art. Based upon the disclosure provided herein, one of ordinary skill in the art will recognize a variety of data decode algorithms that may be used in relation to different embodiments of the present invention.

It is determined whether a natural convergence override has been programmed (block 430). As discussed above, a natural convergence override is programmed to preclude data processing from completing naturally when the originally written data has been recovered by application of the data decode algorithm. Where a natural convergence override has not been programmed (block 430), standard data processing is performed. Such standard data processing includes determining whether application of the data decode algorithm converged (i.e., resulted in the originally written data set as indicated by no remaining parity check errors)(block 435). Where application of the data decode algorithm converged (block 435), processing on the current data set is complete and the resulting decoded output is provided as a data output (block 465) and the process of flow diagram 400 repeats for subsequent data sets.

Alternatively, where application of the data decode algorithm failed to converge (block 435), it is determined whether an allowable number of local iterations (i.e., successive applications of the data decode algorithm) has been exceeded (block 440). Where the allowable number of local iterations has not been reached (block 440), the processes of blocks 425, 430, 435, 440 are repeated for the next local iteration. In contrast, where the allowable number of local iterations has been reached (block 440), it is determined whether the allowable number of global iterations has been reached (block 445). Where the allowable number of global iterations has not been reached (block 445), the processes of blocks 420, 425, 430, 435, 440, 445 are repeated for the next global iteration. In contrast, where the allowable number of global iterations has been reached (block 445), a data set processing failure is indicated (block 450) and the resulting decoded output is provided as a data output (block 465) and the process of flow diagram 400 repeats for subsequent data sets.

Alternatively, where a natural convergence override has not been programmed (block 430), test mode data processing is performed. Such test mode data processing includes determining whether the defined number of local iterations has been reached regardless of any possible convergence (block 455). Where the defined number of local iterations has not yet been reached (block 455), the processes of blocks 425, 430, 455 are repeated for the next local iteration. In contrast, where the defined number of local iterations has been reached (block 455), it is determined whether the defined number of global iterations has been reached (block 460). Where the defined number of global iterations has not been reached (block 460), the processes of blocks 420, 425, 430, 455, 460 are repeated for the next global iteration. In contrast, where the defined number of global iterations has been reached (block 460), the resulting decoded output is provided as a data output (block 465) and the process of flow diagram 400 repeats for subsequent data sets.

Figure 5:
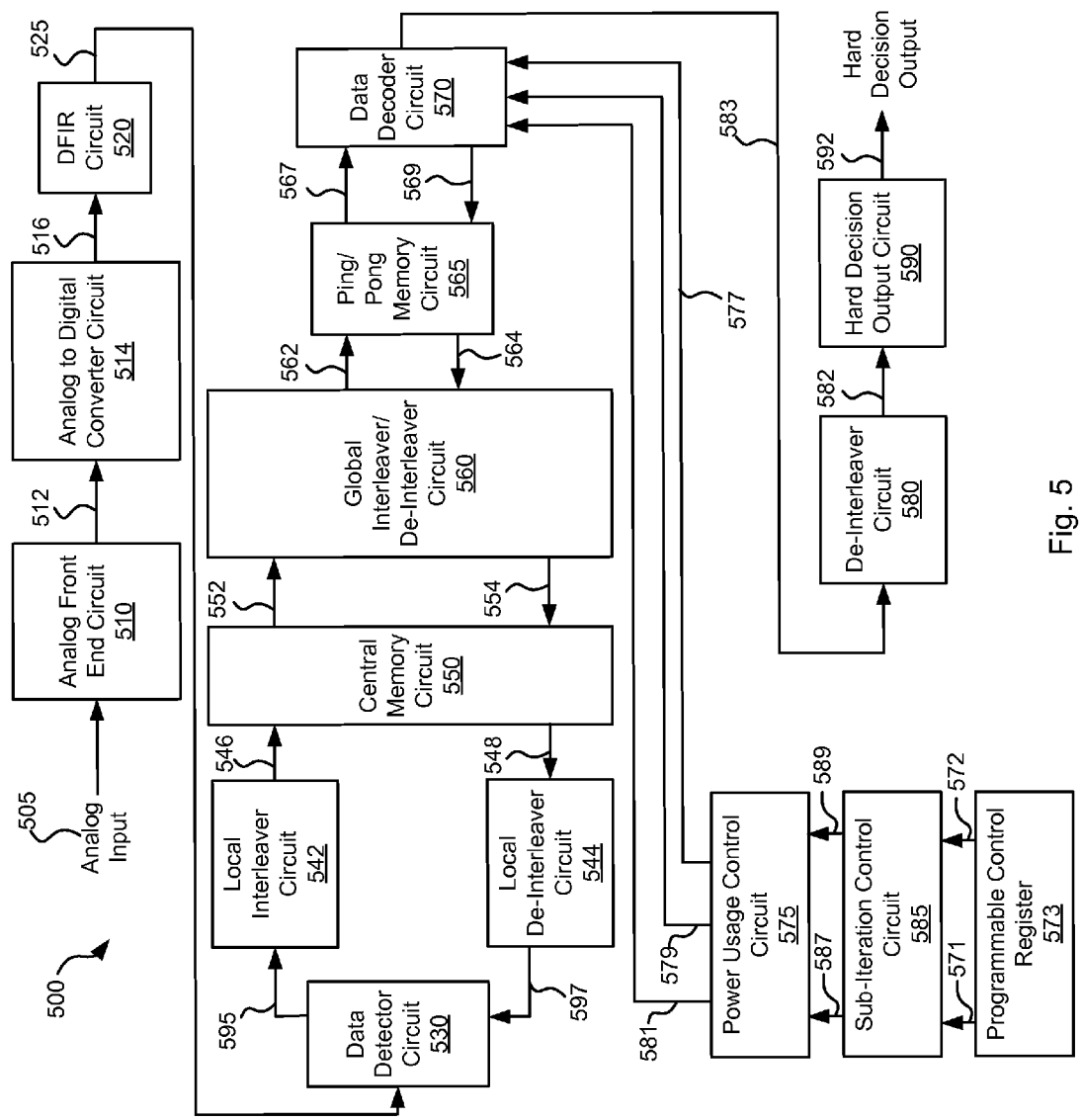
FIG. 5 depicts another data processing circuit having power usage approximation circuitry using sub iteration control in accordance with one or more embodiments of the present invention.

Turning to FIG. 5, a data processing circuit 500 including power usage approximation circuitry using sub iteration control is shown in accordance with one or more embodiments of the present invention. Data processing circuit 500 includes an analog front end circuit 510 that receives an analog signal 505. Analog front end circuit 510 processes analog signal 505 and provides a processed analog signal 512 to an analog to digital converter circuit 514. Analog front end circuit 510 may include, but is not limited to, an analog filter and an amplifier circuit as are known in the art. Based upon the disclosure provided herein, one of ordinary skill in the art will recognize a variety of circuitry that may be included as part of analog front end circuit 510. In some cases, analog signal 505 is derived from a read/write head assembly (not shown) that is disposed in relation to a storage medium (not shown). In other cases, analog signal 505 is derived from a receiver circuit (not shown) that is operable to receive a signal from a transmission medium (not shown). The transmission medium may be wired or wireless. Based upon the disclosure provided herein, one of ordinary skill in the art will recognize a variety of source from which analog input 505 may be derived.

Analog to digital converter circuit 514 converts processed analog signal 512 into a corresponding series of digital samples 516. Analog to digital converter circuit 514 may be any circuit known in the art that is capable of producing digital samples corresponding to an analog input signal. Based upon the disclosure provided herein, one of ordinary skill in the art will recognize a variety of analog to digital converter circuits that may be used in relation to different embodiments of the present invention. Digital samples 516 are provided to an equalizer circuit 520. Equalizer circuit 520 applies an equalization algorithm to digital samples 516 to yield an equalized output 525. In some embodiments of the present invention, equalizer circuit 520 is a digital finite impulse response filter circuit as are known in the art. In some cases, equalizer 520 includes sufficient memory to maintain one or more data sets until a data detector circuit 530 is available for processing.

Equalized output 525 is provided to detector circuit 530 that is operable to apply a data detection algorithm to a received data set, and in some cases can process two or more data sets in parallel. In some embodiments of the present invention, data detector circuit is a Viterbi algorithm data detector circuit as are known in the art. In other embodiments of the present invention, data detector circuit 530 is a maximum a posteriori data detector circuit as are known in the art. Based upon the disclosure provided herein, one of ordinary skill in the art will recognize a variety of data detector circuits that may be used in relation to different embodiments of the present invention. Data detector circuit 530 is started based upon availability of a data set from either equalizer 520 or efficient interleaving/de-interleaving circuit 540.

Data detector circuit 530 applies the data detection algorithm to either a data set received as equalized output 525 or to a data set received as de-interleaved output 597 from local de-interleaver circuit 540. The result of applying the data detection algorithm is a detected output 595 that is provided to a local interleaver circuit 542. When a detected output 595 is ready, it is stored to a central memory circuit 550 where it awaits processing by a data decoder circuit 570. In some cases, detected output 595 is log likelihood ratio data. Before being stored to central memory circuit 550, detected output 595 is processed through local interleaver circuit 542 that shuffles sub-portions (i.e., local chunks) of the data set included as detected output 595 and provides an interleaved data set 546 that is stored to central memory circuit 550. Such shuffling of sub-portions reduces the impact of any burst errors in the data set.

A ping/pong memory circuit 565 is used to pull a global interleaved data set 562 from central memory circuit 550 for data decoder circuit 570 by way of a global interleaver/de-interleaver circuit 560. Once data decoder circuit 570 is available, a global interleaved data set 567 is pulled from ping/pong memory circuit 565 and data decoder circuit 570 applies a data decode algorithm to the received data set. In some embodiments of the present invention, the data decode algorithm is a low density parity check algorithm as are known in the art. Based upon the disclosure provided herein, one of ordinary skill in the art will recognize other decode algorithms that may be used in relation to different embodiments of the present invention. As the data decode algorithm completes on a given data set, the completed data set is written back as a decoded output 569 to ping/pong memory circuit 565. Once the write back is complete to ping/pong memory circuit 565, a corresponding data set 564 is transferred to central memory circuit 550 by way of global interleaver/de-interleaver circuit 560.

When a data set is transferred from central memory circuit 550 as a locally interleaved data set 552, global interleaver/de-interleaver circuit 560 rearranges global chunks of data sets such that multiple data sets may be intermixed across a single row of ping/pong memory 565. A global chunk may be the same size as the local chunks, while in other cases the global chunks may be different in size from the local chunks.

When data set 564 is written from ping/pong memory circuit 565 to central memory circuit 550, global interleaver/de-interleaver circuit 560 reverses the global interleaving (i.e., performs a de-interleaving process) originally applied when the data was originally written from central memory circuit 550 to ping/pong memory circuit 565. This reversal yields a locally interleaved data set 554 that is written to central memory circuit 550. When data detector circuit 530 becomes free, a corresponding locally interleaved data set 548 is provided to data detector circuit 530 as a de-interleaved data set 597 by a local de-interleaver circuit 544. Local de-interleaver circuit 544 reverses the processes originally applied by local interleaver circuit 542. Once data detector circuit 530 completes application of the detection algorithm to de-interleaved data set 597, the result is provided as detected output 595.

Where data decoder circuit 570 converges (i.e., results in the originally written data), the resulting decoded data is provided as a hard decision output 583 to a de-interleaver circuit 580. De-interleaver circuit 580 rearranges the data to reverse both the global and local interleaving applied to the data to yield a de-interleaved output 582. De-interleaved output 582 is provided to a hard decision output circuit 590. Hard decision output circuit 590 is operable to re-order data sets that may complete out of order back into their original order. The originally ordered data sets are then provided as a hard decision output 592.

A power usage control circuit 575 provides a convergence control signal 579, a convergence override signal 581, and a local iteration control signal 577 that are provided to data decoder circuit 570. When asserted, convergence control signal 579 causes data decoder circuit to indicate a convergence and thereby processing of the current data set completes. When de-asserted, convergence control signal 579 disables data decoder circuit from indicating a convergence when convergence override signal 581 is asserted, and thereby processing of the current data set continues. When asserted, convergence override signal 581 disables the ability for data decoder circuit 570 to indicate a convergence except when convergence control signal 579 is asserted. Local iteration control signal 577 is a value corresponding to a forced number of local iterations through data decoder circuits 570 (i.e., the number of successive passes through data decoder circuit 570 that are performed before a subsequent data detection is applied by data detector circuit 530). Global iteration control signal 581 is a value corresponding to a forced number of global iterations through the combination of data detector circuit 530 and data decoder circuit 570.

A programmable control register 573 may be user programmable to include a value 571 corresponding to a number of local iterations, and a value 572 corresponding to a number of global iterations. Value 517 and value 572 may be fractional numbers (e.g., 2.25) and power usage control circuit 575 is only designed to allow integer values. A sub-iteration control circuit 585 is operable to translate between the fraction numbers provided from programmable control register 573, and the integer values expected by power usage control circuit 575. Sub-iteration control circuit 585 operates by providing a value 587 corresponding to a number of local iterations and a value 589 corresponding to a number of global iterations over a number of processes to yield average values that correspond to value 571 and value 572 respectively. For example, where value 572 is 2.5, sub-iteration control circuit 585 sets value 589 to 2 for a first pass and 3 for a second pass resulting in an average number of global iterations of 2.5. As another example, where value 572 is 2.25, sub-iteration control circuit 585 sets value 589 to 2 for the first three passes and 3 for a fourth pass resulting in an average number of global iterations of 2.25. The same process is applied by sub-iteration control circuit 585 to yield a fractional number of local iterations to power usage control circuit 575 that accepts integer values.

Value 587 and Value 589 are provided to power usage control circuit 575 where they are used to govern assertion of convergence control signal 579, the value provided as local iteration control signal 579, and convergence override signal 581. Where value 572 exceeds a defined limit, convergence override signal 581 is always de-asserted such that processing of data decoder circuit 570 naturally converges when the original data set is recovered. Alternatively, where value 572 is less than or equal to the defined limit, convergence override signal 581 is asserted. During this time, data decoder circuit 570 only indicates a convergence when convergence control signal 579 is asserted. As such, power usage control circuit 575 asserts convergence control signal 579 once the number of global iterations indicated by value 572 have been completed. The value provided as local iteration control signal 577 corresponds to value 571.

For standard operation (i.e., non-test operation), programmable control register 573 is programmed with a value 572 that is greater than a defined limit such that data decoder circuit 570 performs a defined number of local iterations and a number of global iterations limited, at least in part, based upon a natural convergence of a currently processing data set.

For test operation, programmable control register 573 is programmed with a value 572 indicating a desired number of global iterations, and a value 571 indicating a desired number of local iterations. The combination of the desired number of local iterations and global iterations is selected based upon a number of local and global iterations that would be expected for a defined error rate. As such, measuring power usage of data processing circuit 100 operating at the defined number of local iterations and global iterations yields an approximate power usage for the defined error rate.

The following pseudo-code describes an example operation of data processing circuit 100:

```
Repeat for a Number of Passes Sufficient to Generate the Fractional Iteration Values Using Different Values 587, 589 for Each Pass to Yield the Desired Average Values
{
  Number of Global Iterations = 0;
  If(Value 572 > Defined Number)
  {
    De-assert convergence override signal 581; /* enable standard or natural convergence*/
    While (Number of Global Iterations <= MAX) /*maximum number of global iterations*/
    {
      Perform Data Detection Using Data Detector Circuit 530;
      For (i=1 to Local Iterations Limit) /*perform a number of local iterations*/
      {
        Perform Data Decode Using Data Decoder Circuit 570;
        If (Convergence) /* if natural convergence*/
        {
          Number of Global Iterations = MAX
        }
      }
      Number of Global Iterations += 1;
    }
  }
  Else
  {
    Assert convergence override signal 581; /* disable standard or natural convergence*/
    While (Number of Global Iterations <= Value 589) /*forced number of global iterations*/
    {
      De-assert convergence control signal 579;
      Perform Data Detection Using Data Detector Circuit 530;
      For (i=1 to Value 587) /*perform the defined number of local iterations*/
      {
        Perform Data Decode Using Data Decoder Circuit 570;
      }
      Number of Global Iterations += 1;
    }
    Assert convergence control signal 579 /*forced completion (force convergence)*/
  }
}
```

Figure 6:
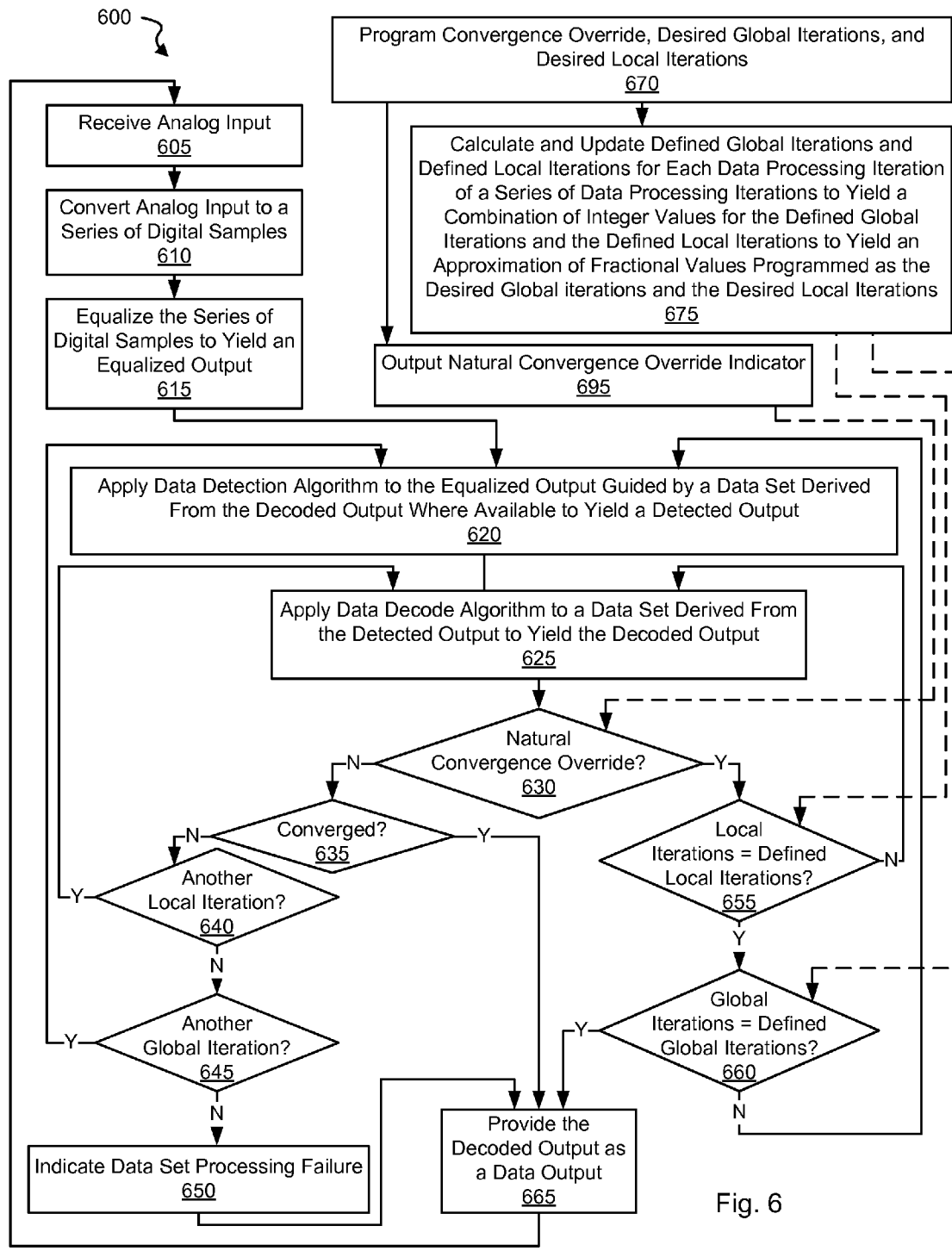
FIG. 6 is a flow diagram showing a method in accordance with some embodiments of the present invention for power usage control and characterization in a data processing circuit using sub-iteration control.

Turning to FIG. 6, a flow diagram 600 shows a method in accordance with some embodiments of the present invention for power usage control and characterization in a data processing circuit using sub-iteration control. Following flow diagram 600, a convergence override, a desired number of global iterations, and a desired number of local iterations are programmed (block 670). Where the convergence override indicator is set, a natural convergence override indicator is provided to a data processing circuit (block 695). Such a natural convergence override indicator causes the data processing to continue until a defined number of global iterations (block 675) based upon the programmed desired global iterations (block 670) for a given pass through blocks 605-665 and a defined number of local iterations per each global iteration (block 675) based upon the programmed desired local iterations (block 670) for a given pass through blocks 605-665 have completed regardless of any natural convergence (i.e., recovery of the originally written data set). Otherwise, where the natural convergence override indicator is not set, standard data processing is performed that concludes based either on a natural convergence or a time out condition.

The desired global iterations and the desired local iterations may be programmed as fractional numbers. The data processing is not able to perform a fractional local iteration or a fractional global iteration. However, to achieve a fractional number of local iterations and/or a fractional number of global iterations, defined numbers of local iterations and global iterations are calculated for each iteration through blocks 605-665 that result in operation reflecting the desired fractional iterations (block 675). As an example, where the programmed, desired global iterations is 2.5 and the programmed, desired local iterations is 2.4 per global iteration, the defined global iterations may be set to 2 and the defined local iterations may be set to 3 for one pass through blocks 605-665, and the defined number of global iterations may be set to 3 and the defined number of local iterations per global iterations may be set to 3 for an alternating pass through blocks 605-665. Such a situation yields a total of five global iterations per two passes through blocks 605-665 or an average of 2.5 global iterations per pass, and a total of 12 local iterations per two passes through blocks 605-665 or an average of 2.4 local iterations per global iteration. Based upon the disclosure provided herein, one of ordinary skill in the art will recognize that changes in the defined number of global iterations and the defined number of local iterations may be spread across three or more passes through blocks 605-665 to yield virtually any fractional number of global iterations and local iterations per global iteration.

An analog input signal is received (block 605). The analog input may be derived from, for example, a storage medium or a data transmission channel. Based upon the disclosure provided herein, one of ordinary skill in the art will recognize a variety of sources of the analog input. The analog input is converted to a series of digital samples (block 610). This conversion may be done using an analog to digital converter circuit or system as are known in the art. Of note, any circuit known in the art that is capable of converting an analog signal into a series of digital values representing the received analog signal may be used. The resulting digital samples are equalized to yield an equalized output (block 615). In some embodiments of the present invention, the equalization is done using a digital finite impulse response circuit as are known in the art. Based upon the disclosure provided herein, one of ordinary skill in the art will recognize a variety of equalizer circuits that may be used in place of such a digital finite impulse response circuit to perform equalization in accordance with different embodiments of the present invention.

A data detection algorithm is applied to the equalized output guided by a data set derived from a decoded output where a such a decoded output is available. This process yields a detected output (block 620). In some embodiments of the present invention, data detection algorithm is a Viterbi algorithm as are known in the art. In other embodiments of the present invention, the data detection algorithm is a maximum a posteriori data detector circuit as are known in the art. A data decode algorithm is applied to a data set derived from the detected output to yield a decoded output (block 625). In some cases, the data decode algorithm is a low density parity check algorithm as are known in the art. Based upon the disclosure provided herein, one of ordinary skill in the art will recognize a variety of data decode algorithms that may be used in relation to different embodiments of the present invention.

It is determined whether a natural convergence override has been programmed (block 630). As discussed above, a natural convergence override is programmed to preclude data processing from completing naturally when the originally written data has been recovered by application of the data decode algorithm. Where a natural convergence override has not been programmed (block 630), standard data processing is performed. Such standard data processing includes determining whether application of the data decode algorithm converged (i.e., resulted in the originally written data set as indicated by no remaining parity check errors)(block 635). Where application of the data decode algorithm converged (block 635), processing on the current data set is complete and the resulting decoded output is provided as a data output (block 665) and the process of flow diagram 600 repeats for subsequent data sets.

Alternatively, where application of the data decode algorithm failed to converge (block 635), it is determined whether an allowable number of local iterations (i.e., successive applications of the data decode algorithm) has been exceeded (block 640). Where the allowable number of local iterations has not been reached (block 640), the processes of blocks 625, 630, 635, 640 are repeated for the next local iteration. In contrast, where the allowable number of local iterations has been reached (block 640), it is determined whether the allowable number of global iterations has been reached (block 645). Where the allowable number of global iterations has not been reached (block 645), the processes of blocks 620, 625, 630, 635, 640, 645 are repeated for the next global iteration. In contrast, where the allowable number of global iterations has been reached (block 645), a data set processing failure is indicated (block 650) and the resulting decoded output is provided as a data output (block 665) and the process of flow diagram 600 repeats for subsequent data sets.

Alternatively, where a natural convergence override has not been programmed (block 630), test mode data processing is performed. Such test mode data processing includes determining whether the defined number of local iterations has been reached regardless of any possible convergence (block 655). Where the defined number of local iterations has not yet been reached (block 655), the processes of blocks 625, 630, 655 are repeated for the next local iteration. In contrast, where the defined number of local iterations has been reached (block 655), it is determined whether the defined number of global iterations has been reached (block 660). Where the defined number of global iterations has not been reached (block 660), the processes of blocks 620, 625, 630, 655, 660 are repeated for the next global iteration. In contrast, where the defined number of global iterations has been reached (block 660), the resulting decoded output is provided as a data output (block 665) and the process of flow diagram 600 repeats for subsequent data sets.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing system, the data processing system comprising:
 a data detector circuit operable to apply a data detection algorithm to a data input to yield a detected output;

a data decoder circuit operable to apply a data decode algorithm to a data set derived from the detected output to yield a decoded output; and a power usage control circuit operable to force a defined number of global iterations to be applied to the data input by the data detector circuit and the data decoder circuit regardless of convergence of the data decode algorithm.

2. The data processing system of claim 1, wherein the data decoder circuit is further operable to complete processing of the data input based at least in part upon convergence of the data decode algorithm; and wherein the power usage control circuit is further operable to override completion of processing of the data input based upon convergence of the data decode algorithm.

3. The data processing system of claim 1, wherein the power usage control circuit is further operable to force a defined number of local iterations applied to the data set derived from the detected output by the data decoder circuit per global iteration.

4. The data processing system of claim 1, wherein the system further comprises:
a programmable control register operable to store a value corresponding to the defined number of global iterations.

5. The data processing system of claim 1, wherein the data decode algorithm is selected from a group consisting of: a Reed Solomon data decode algorithm, and a low density parity check decode algorithm.

6. The data processing system of claim 1, wherein the data detection algorithm is selected from a group consisting of: a maximum a posteriori data detection algorithm, and a Viterbi algorithm data detector circuit.

7. The data processing system of claim 1, wherein the data processing system is implemented as part of a device selected from a group consisting of: a storage device and a receiving device.

8. The data processing system of claim 1, wherein the data processing system is implemented as part of an integrated circuit.

9. The data processing system of claim 3, wherein the system further comprises:
a programmable control register operable to store a value corresponding to the defined number of local iterations.

10. The data processing system of claim 4, wherein the value corresponding to the defined number of global iterations is a fractional value, and wherein the power usage control circuit further operable to force a first defined number of global iterations applied to the data input by the data detector circuit and the data decoder circuit regardless of convergence of the data decode algorithm during a first processing period and a second defined number of global iterations applied to the data input by the data detector circuit and the data decoder circuit regardless of convergence of the data decode algorithm during a second processing period to yield an approximation of the value corresponding to the defined number of global iterations.

11. The data processing system of claim 9, wherein the value corresponding to the defined number of local iterations is a fractional value, and wherein the power usage control circuit further operable to force a first defined number of local iterations applied to the data set derived from the detected output by the data decoder circuit regardless of convergence of the data decode algorithm during a first processing period and a second defined number of local iterations applied to the data set derived from the detected output by the data decoder circuit regardless of convergence of the data decode algorithm during a second processing period to yield an approximation of the value corresponding to the defined number of local iterations.

12. A method power usage characterization of a data processing device, the method comprising:
applying a data detection algorithm by a data detector circuit to a data input to yield a detected output;
applying a data decode algorithm by a data decoder circuit to a data set derived from the detected output to yield a decoded output; and
forcing a defined number of global iterations to be applied to the data input by the data detector circuit and the data decoder circuit regardless of convergence of the data decode algorithm.

13. The method of claim 12, wherein the method further comprises:
programming a control register with a value corresponding to the defined number of global iterations.

14. The method of claim 12, wherein data decode circuit is operable to complete processing of the data input based at least in part upon convergence of the data decode algorithm, and wherein the method further comprises:
overriding completion of processing of the data input based upon convergence of the data decode algorithm.

15. The method of claim 12, wherein the method further comprises:
forcing a defined number of local iterations applied to the data set derived from the detected output by the data decoder circuit per global iteration.

16. The method of claim 13, wherein the value corresponding to the defined number of global iterations is a fractional value, and wherein the method further comprises:
forcing a first defined number of global iterations applied to the data input by the data detector circuit and the data decoder circuit regardless of convergence of the data decode algorithm during a first processing period and a second defined number of global iterations applied to the data input by the data detector circuit and the data decoder circuit regardless of convergence of the data decode algorithm during a second processing period to yield an approximation of the value corresponding to the defined number of global iterations.

17. The method of claim 16, wherein the method further comprises:
programming a control register with a value corresponding to the defined number of local iterations.

18. The method of claim 17, wherein the value corresponding to the defined number of local iterations is a fractional value, and wherein the method further comprises:
forcing a first defined number of local iterations applied to the data set derived from the detected output by the data decoder circuit regardless of convergence of the data decode algorithm during a first processing period and a second defined number of local iterations applied to the data set derived from the detected output by the data decoder circuit regardless of convergence of the data decode algorithm during a second processing period to yield an approximation of the value corresponding to the defined number of local iterations.

19. A storage device, the storage device comprising:
a storage medium;
a head assembly disposed in relation to the storage medium and operable to provide a sensed signal corresponding to information on the storage medium;

a read channel circuit including:

an analog to digital converter circuit operable to sample an analog signal derived from the sensed signal to yield a series of digital samples;

an equalizer circuit operable to equalize the digital samples to yield a detector input;

a data detector circuit operable to apply a data detection algorithm to a detector input to yield a detected output;

a data decoder circuit operable to apply a data decode algorithm to a data set derived from the detected output to yield a decoded output; and a power usage control circuit operable to force a defined number of local iterations to be applied to the data set derived from the detected output by the data decoder circuit per global iteration applied to the detector input by the data detector circuit and the data decoder circuit regardless of convergence of the data decode algorithm.

20. The storage device of claim 19, wherein the power usage control circuit is further operable to force a defined number of global iterations applied to the detector input by the data detector circuit and the data decoder circuit regardless of convergence of the data decode algorithm.

* * * * *